United States Patent
Yamakawa (10) Patent No.: US 7,290,126 B2
(45) Date of Patent: Oct. 30, 2007

(54) ONE-CHIP MICROCOMPUTER WITH MULTIPLE TIMERS

(75) Inventor: Kentaro Yamakawa, Kodaira (JP)

(73) Assignees: Renesas Technology Corp., Tokyo (JP); Renesas Northern Japan Semiconductor, Inc., Chitose-shi, Hokkaido (JP)

( * ) Notice: Subject to any disclaimer, the term of this patent is extended or adjusted under 35 U.S.C. 154(b) by 718 days.

(21) Appl. No.: 10/681,143

(22) Filed: Oct. 9, 2003

(65) Prior Publication Data

US 2004/0078616 A1    Apr. 22, 2004

(30) Foreign Application Priority Data

Oct. 11, 2002    (JP)    ............................. 2002-298189

(51) Int. Cl.
*G06F 9/00* (2006.01)

(52) U.S. Cl. .................... 713/1; 713/600; 702/132; 375/238

(58) Field of Classification Search ............... 713/600, 713/1; 375/238; 702/132
See application file for complete search history.

(56) References Cited

U.S. PATENT DOCUMENTS

| | | | | |
|---|---|---|---|---|
| 4,856,078 A | * | 8/1989 | Konopka | .................... 388/831 |
| 5,293,628 A | * | 3/1994 | Langan et al. | .............. 713/502 |
| 5,577,235 A | * | 11/1996 | Mitra | .......................... 713/600 |
| 5,617,007 A | * | 4/1997 | Keidl et al. | .................. 320/141 |
| 5,933,344 A | * | 8/1999 | Mitsuishi et al. | ............. 700/13 |
| 6,006,168 A | * | 12/1999 | Schumann et al. | ......... 702/132 |
| 7,098,617 B1 | * | 8/2006 | Oljaca et al. | ............... 318/268 |
| 7,113,541 B1 | * | 9/2006 | Lys et al. | .................... 375/238 |
| 2002/0005861 A1 | * | 1/2002 | Lewis | ......................... 345/691 |
| 2002/0066281 A1 | * | 6/2002 | Gunasekera | ................. 62/186 |

FOREIGN PATENT DOCUMENTS

JP    09-006934    1/1997

* cited by examiner

*Primary Examiner*—Chun Cao
*Assistant Examiner*—Vincent T Tran
(74) *Attorney, Agent, or Firm*—Miles & Stockbridge PC (57) ABSTRACT

The present invention provides a one-chip microcomputer that can realize the control of cooling equipment, the control of the brightness of a display device, and the control of the charge and discharge of a battery without mounting an analog circuit. The one-chip microcomputer is used in a notebook-size personal computer, and comprises: a CPU that performs operation processing; a CPG that generates a clock signal; a flash memory that stores a control program; a RAM that sores data; an 8-bit timer that controls fans; and a 14-bit timer that controls an LCD brightness controller of an LCD and a voltage charger of batteries. The one-chip microcomputer controls the fans by the 8-bit timer without mounting the analog circuit and can adjust the LCD brightness by the 14-bit timer.

6 Claims, 12 Drawing Sheets

| TCRX | TCSR | | | DESCRIPTION |
|---|---|---|---|---|
| BIT 5 | BIT 2 | BIT 1 | BIT 0 | |
| CKSX | CKS 2 | CKS 1 | CKS 0 | |
| 0 | 0 | 0 | 0 | |
| 0 | 0 | 0 | 1 | |
| 0 | 0 | 1 | 0 | |
| 0 | 0 | 1 | 1 | |
| 0 | 1 | 0 | 0 | |
| 1 | 0 | 0 | 0 | CLOCK INPUT INHIBIT |
| 1 | 0 | 0 | 1 | COUNT IN $\phi/2{,}048$ |
| 1 | 0 | 1 | 0 | COUNT IN $\phi/4{,}096$ |
| 1 | 0 | 1 | 1 | COUNT IN $\phi/8{,}192$ |
| 1 | 1 | 0 | 0 | COUNT IN A COMPARE MATCH |
| — | 1 | 0 | 1 | |
| — | 1 | 1 | 0 | |
| — | 1 | 1 | 1 | |

FIG. 5

| TCRY | TCSR | | | DESCRIPTION |
|---|---|---|---|---|
| BIT 4 | BIT 2 | BIT 1 | BIT 0 | |
| CKSY | CKS 2 | CKS 1 | CKS 0 | |
| 0 | 0 | 0 | 0 | |
| 0 | 0 | 0 | 1 | |
| 0 | 0 | 1 | 0 | |
| 0 | 0 | 1 | 1 | |
| 0 | 1 | 0 | 0 | |
| 1 | 0 | 0 | 0 | CLOCK INPUT INHIBIT |
| 1 | 0 | 0 | 1 | COUNT IN φ/4,096 |
| 1 | 0 | 1 | 0 | COUNT IN φ/8,192 |
| 1 | 0 | 1 | 1 | COUNT IN φ/16,384 |
| 1 | 1 | 0 | 0 | COUNT IN AN OVERFLOW |
| — | 1 | 0 | 1 | |
| — | 1 | 1 | 0 | |
| — | 1 | 1 | 1 | |

| BIT | BIT NAME | INITIAL VALUE | R/W | DESCRIPTION |
|---|---|---|---|---|
| 7 | PWCKX1B | 0 | R/W | PWMX_1 CLOCK SELECT |
| 6 | PWCKX1A | 0 | R/W | WHEN CKS OF DACR OF PWMX_1 IS 1, SELECTS A CLOCK (REFER TO FIG. 9) |
| 5 | PWCKX0B | 0 | R/W | PWMX_0 CLOCK SELECT |
| 4 | PWCKX0A | 0 | R/W | WHEN CKS OF DACR OF PWMX_0 IS 1, SELECTS A CLOCK (REFER TO FIG. 9) |
| 3 | PWCKX1C | 0 | R/W | PWMX_1 CLOCK SELECT WHEN CKS OF DACR OF PWMX_1 IS 1, SELECTS A CLOCK (REFER TO FIG. 9) |
| 2 |  |  |  |  |
| 1 |  |  |  |  |
| 0 | PWCKX0C | 0 | R/W | PWMX_0 CLOCK SELECT WHEN CKS OF DACR OF PWMX_0 IS 1, SELECTS A CLOCK (REFER TO FIG. 9) |

FIG. 9

| PWCKX0C PWCKX1C | PWCKX0B PWCKX1B | PWCKX0A PWCKX1A | RESOLUTION(T) |
|---|---|---|---|
| 0 | 0 | 0 | OPERATES AT A SYSTEM CLOCK CYCLE MULTIPLIED BY 2 |
| 0 | 0 | 1 | OPERATES AT A SYSTEM CLOCK CYCLE MULTIPLIED BY 64 |
| 0 | 1 | 0 | OPERATES AT A SYSTEM CLOCK CYCLE MULTIPLIED BY 128 |
| 0 | 1 | 1 | OPERATES AT A SYSTEM CLOCK CYCLE MULTIPLIED BY 256 |
| 1 | 0 | 0 | OPERATES AT A SYSTEM CLOCK CYCLE MULTIPLIED BY 1,024 |
| 1 | 0 | 1 | OPERATES AT A SYSTEM CLOCK CYCLE MULTIPLIED BY 4,096 |
| 1 | 1 | 0 | OPERATES AT A SYSTEM CLOCK CYCLE MULTIPLIED BY 16,384 |
| 1 | 1 | 1 | SETTING INHIBIT |

FIG. 10

| BIT | BIT NAME | DESCRIPTION |
|---|---|---|
| 15 | DA13 | OUTPUT WAVEFORM SETTING (REFER TO FIG. 11) |
| 14 | DA12 | |
| 13 | DA11 | |
| 12 | DA10 | |
| 11 | DA9 | |
| 10 | DA8 | |
| 9 | DA7 | |
| 8 | DA6 | |
| 7 | DA5 | |
| 6 | DA4 | |
| 5 | DA3 | |
| 4 | DA2 | |
| 3 | DA1 | |
| 2 | DA0 | |
| 1 | CFS | ·R/W CARRIER FREQUENCY SELECT<br>0: OPERATES AT BASIC CYCLE=RESOLUTION(T) MULTIPLIED BY 64 THE RANGE OF THE VALUES OF DA0 TO DA13 IS H'0100 TO H'3FFF<br>1: OPERATES AT BASIC CYCLE=RESOLUTION(T) MULTIPLIED BY 256 THE RANGE OF THE VALUES OF DA0 TO DA13 IS H'0040 TO H'3FFF |
| 0 | — | RESERVED BIT |

FIG. 11

| RESOLUTION T (μs) | CONVERSION CYCLE (μs) | DADRA,B (DA13~DA0) | LOW WIDTH (μs) | HIGH WIDTH (μs) |
|---|---|---|---|---|
| 0.1 | 1638.4 | H'0000 | 0.1 | 1638.3 |
| | | ... | ... | ... |
| | | H'1000 | 409.6 | 1228.7 |
| | | ... | ... | ... |
| | | H'3FFF | 1638.3 | 0.1 |

FIG. 12

ONE-CHIP MICROCOMPUTER WITH MULTIPLE TIMERS

BACKGROUND OF THE INVENTION

The present invention relates to a microcomputer, and, more particularly, to an effective art obtained by applying to a microcomputer that is suitable for the control of cooling equipment and the brightness control of a display device in the microcomputer formed on one chip, what is called a one-chip microcomputer.

According to what this inventor investigated, the following art is taken into consideration concerning a microcomputer.

For instance, a one-chip microcomputer used in a notebook-size personal computer as an example of the microcomputer is composed of a CPU (Central Processing Unit) that performs operation processing, a CPG (Clock Pulse Generator) that generates a clock signal, a flash memory that stores control programs, a RAM (Random Access Memory) that stores data, an A/D (Analog/Digital) circuit or a D/A (Digital/Analog) circuit that controls peripheral equipment, such as a cooling fan and a LCD (Liquid Crystal Display), an I/O (Input/Output) circuit that is connected to an external device, and a bus interface, which are formed on one chip.

Moreover, in this type of microcomputer, in order to control a back-light power supply of the LCD, for instance, there is an art of a microcomputer for liquid crystal display in which a PWM (Pulse Width Modulation) circuit that generates a desired voltage by varying High and Low periods was mounted in one chip (refer to patent Publication 1, for instance).

[Patent Publication 1]
Japanese Patent Laid-Open No. Hei 9(1997)-6934

SUMMARY OF THE INVENTION

Incidentally, this inventor investigated the microcomputer as described previously. As a result of this investigation, what follows became clear.

For instance, as described previously, a one-chip microcomputer that controls peripheral equipment, such as a fan or an LCD through an analog circuit must mount the analog circuit. Accordingly, an increase in a chip size is caused, and an exclusive analog power supply must be mounted on the occasion of substrate mounting or a chip layout. As this result, the increase in this chip size or the mounting of the exclusive analog power supply results in a cost increase of the one-chip microcomputer.

Moreover, even in the art of aforementioned Patent Literature 1, an LCD can be controlled through a PWM circuit. In spite of this, to control a fan by the same one-chip microcomputer, a circuit that controls this fan is needed, but it is not considered even that the fan is controlled.

Accordingly, one object of the present invention is to provide a one-chip microcomputer that can realize not only the control of cooling equipment and the brightness control of a display device but also the charge and discharge control of a battery without mounting an analog circuit that requires an increase in a chip size and the mounting of an exclusive analog power supply.

This and other objects of the present invention and its new characteristics will become clear from the description of this specification and its appended drawings.

Among inventions disclosed in this application, an outline of the typical invention will be described briefly below.

That is, the present invention is applied to a one-chip microcomputer, and includes a low resolution timer that can be used for controlling cooling equipment and a high resolution timer that can be used for adjusting the brightness of a display device. Accordingly, the cooling equipment can be controlled by the low resolution timer and the brightness of the display device can be adjusted by the high resolution timer. Consequently, because any analog circuit need not be mounted, any exclusive analog power supply is not needed. As a result, a reduction in a chip size and the simplification of a system can be realized.

In this one-chip microcomputer, the high resolution timer can be used furthermore for controlling the charge and discharge of a battery. Moreover, the low resolution timer is regarded as a low frequency output terminal and the high resolution timer is regarded as a high frequency output terminal. These low and high frequencies are generated by frequency-dividing a standard clock signal. Moreover, the high resolution timer has a PWM circuit.

DESCRIPTION OF PREFERRED EMBODIMENTS

Embodiments of the present invention are described in detail below with reference to the drawings. Moreover, in all drawings for describing the embodiments, a member having the same function is marked by the same symbol and its repeated explanation is omitted.

Figure 1:
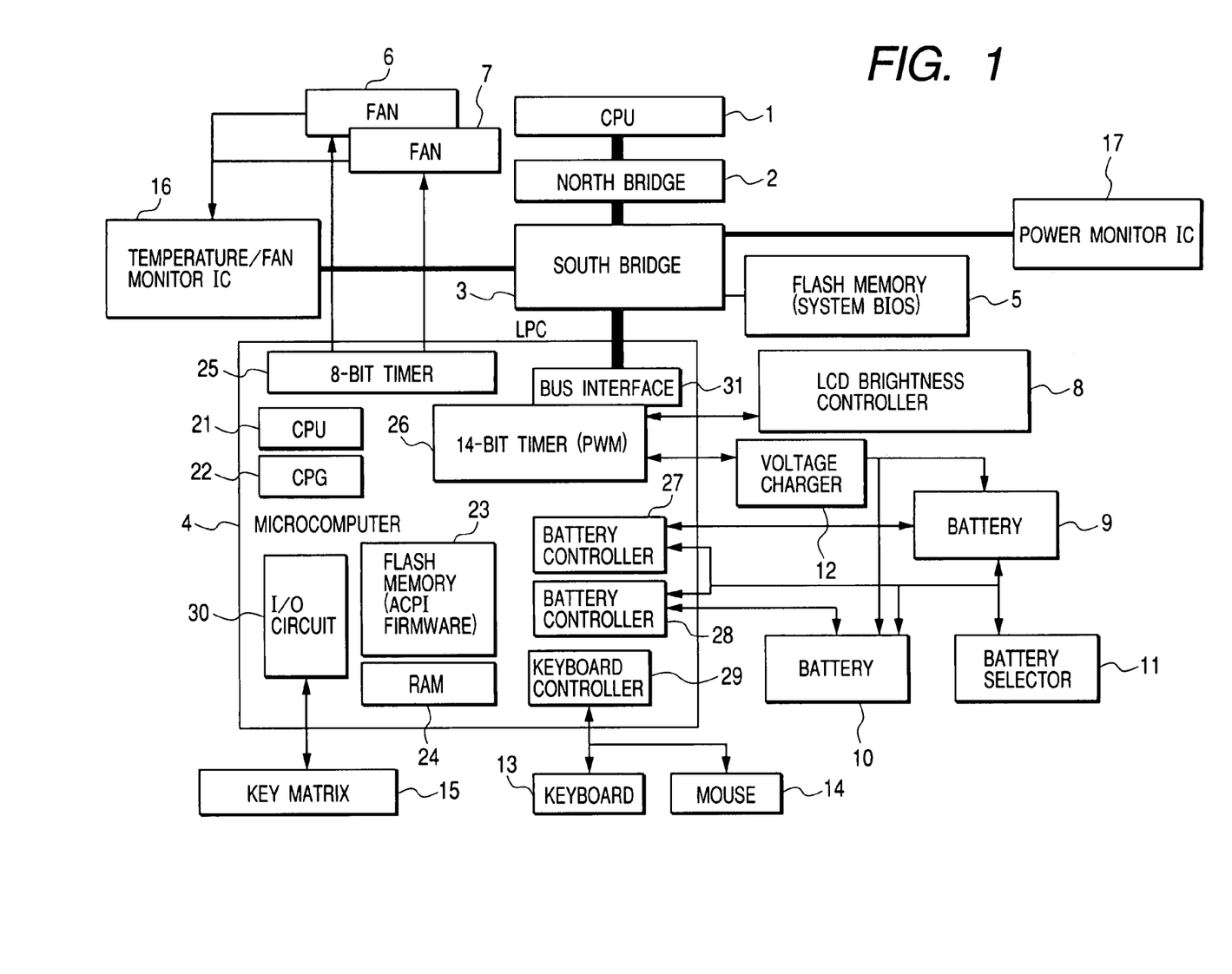
FIG. 1 is a block diagram showing a notebook-size personal computer using a one-chip microcomputer according to one embodiment of the present invention.

An example of the configuration of a notebook-size personal computer using a one-chip microcomputer according to one embodiment of the present invention is described with reference to FIG. 1. FIG. 1 shows a block diagram of the notebook-size personal computer using the one-chip microcomputer.

The notebook-size personal computer using the one-chip microcomputer of this embodiment is composed of, for instance, a CPU 1 that performs the overall operation processing, a north bridge 2 and a south bridge 3 that control mutual data transfer, a one-chip microcomputer 4 that controls peripheral equipment, a flash memory 5 that stores a control program (system BIOS (Basic Input Output System)), two fans 6, 7 that are cooling equipment, an LCD brightness controller 8 that controls the brightness of an LCD that is a display device, two batteries 9, 10 that are used as power supplies, a battery selector 11 that switches the batteries 9, 10, a voltage charger 12 that charges the batteries 9, 10, a keyboard 13 and a mouse 14 that are input devices, a key matrix 15 that performs the keystroke conversion of the keyboard 13, a temperature/fan monitor IC 16 that monitors temperature and a fan rotation, and a power monitor IC 17 that monitors electric power.

The one-chip microcomputer 4 is composed of a CPU 21 that performs operation processing, a CPG 22 that generates a clock signal, a flash memory 23 that stores a control program (ACPI (Advanced Configuration and Power Interface) firmware), a RAM 24 that stores data, a 8-bit timer 25 that controls the fans 6, 7, a 14-bit timer 26 that controls the LCD brightness controller 8 and the voltage charger 12, battery controllers 27, 28 that control the batteries 9, 10 and the batteries 9, 10 and the battery selector 11, a keyboard controller 29 that controls the keyboard 13 and the mouse 14, an I/O circuit 30 that connects with the key matrix 15, and a bus interface 31 with an LPC bus that connects with the CPU 1 via the north bridge 2 and the south bridge 3. This one-chip microcomputer 4 is formed on one chip using a semiconductor fabrication art known to the public.

Figure 2:
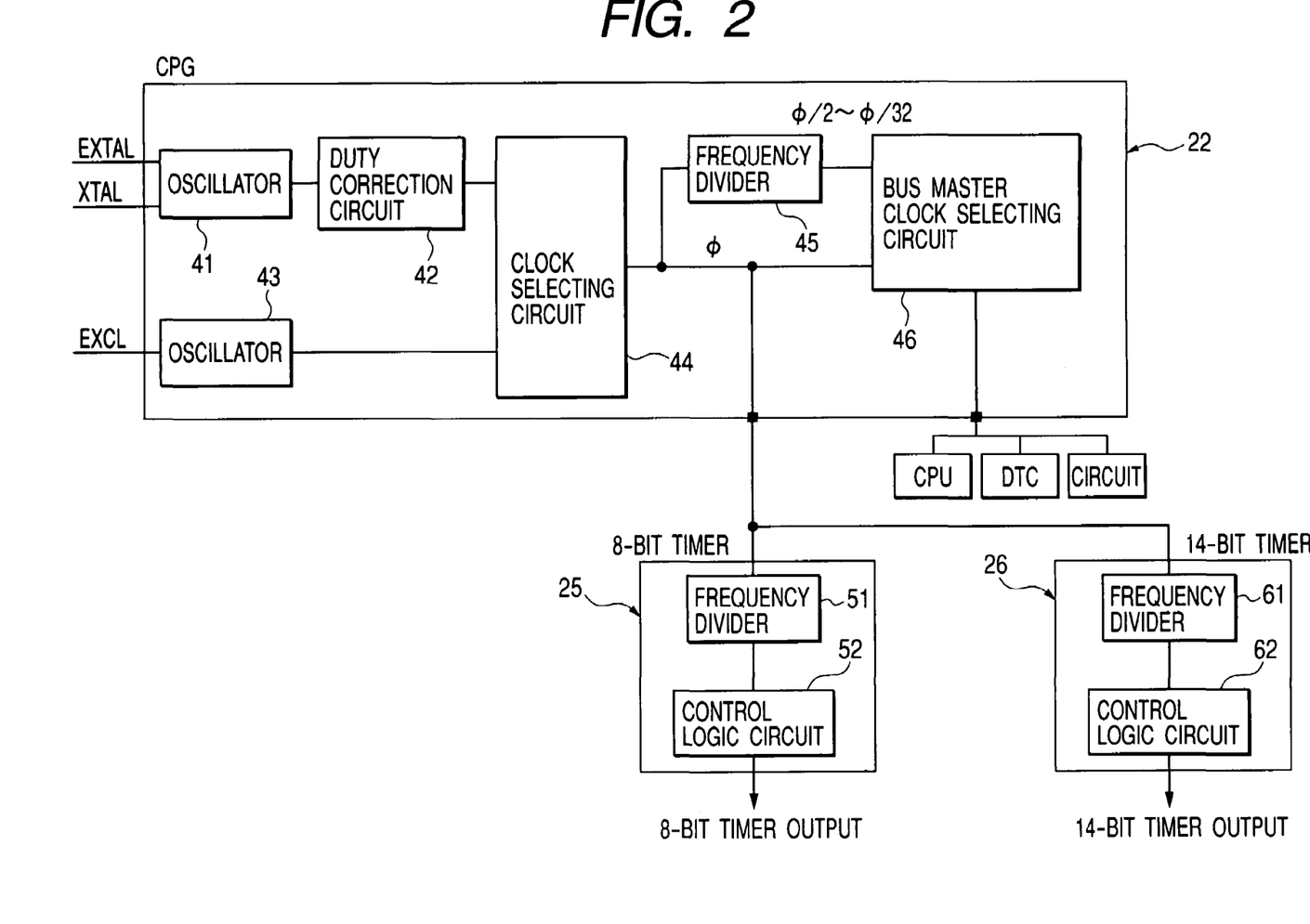
FIG. 2 is a block diagram showing a CPG, an 8-bit timer, and a 14-bit timer in the one-chip microcomputer according to the one embodiment of the present invention.

Subsequently, an example of the configuration of a CPG, an 8-bit timer, and a 14-bit timer in a one-chip microcomputer is described with reference to FIG. 2. FIG. 2 shows a block diagram of the CPG, the 8-bit timer, and the 14-bit timer.

The CPG 22 is composed of an oscillator 41 that uses clock signals EXTAL, XTAL as input, a duty correction circuit 42 that corrects the clock signals output from this oscillator 41 for a duty, an oscillator 43 that uses a low frequency clock signal EXCL as input in another system, a clock selecting circuit 44 that selects any of the clock signal output from the duty correction circuit 42 and the clock signal output from the oscillator 43, a frequency divider 45 that frequency-divides a clock signal $\Phi$ output from this clock selecting circuit 44, and a bus master clock selecting circuit 46 that selects any of clock signals $\Phi/2$ to $\Phi/32$ output from this frequency divider 45 and the clock signal $\Phi$ output from the clock selecting circuit 44.

In this CPG 22, the clock signal output from the bus master clock selecting circuit 46 is supplied to the CPU 21 or a DTC and this CPU 21 or DTC operates synchronizing with a bus master clock signal. Further, the clock signal $\Phi$ output from the clock selecting circuit 44 is supplied to the 8-bit timer 25 and the 14-bit timer 26 respectively and this clock signal $\Phi$ is fixed as a standard.

The 8-bit timer 25 is described later. The timer, however, uses the clock signal $\Phi$ output from the clock selecting circuit 44 of the CPG 22 as input and is composed of a frequency divider 51 that frequency-divides the clock signal $\Phi$ that is fixed as this standard, and a control logic circuit 52 that operates and processes the clock signal frequency-divided by this frequency divider 51. A low frequency signal is output from this control logic circuit 52.

The 14-bit timer 26 is described later. The timer, however, uses the clock signal $\Phi$ output from the clock selecting circuit 44 of the CPG 22 as input and is composed of a frequency divider 61 that frequency-divides the clock signal $\Phi$ that is fixed as this standard and a control logic circuit 62 that processes the clock signal frequency-divided by this frequency divider 61 for pulse width conversion. A high frequency signal is output from this control logic circuit 62.

Figure 3:
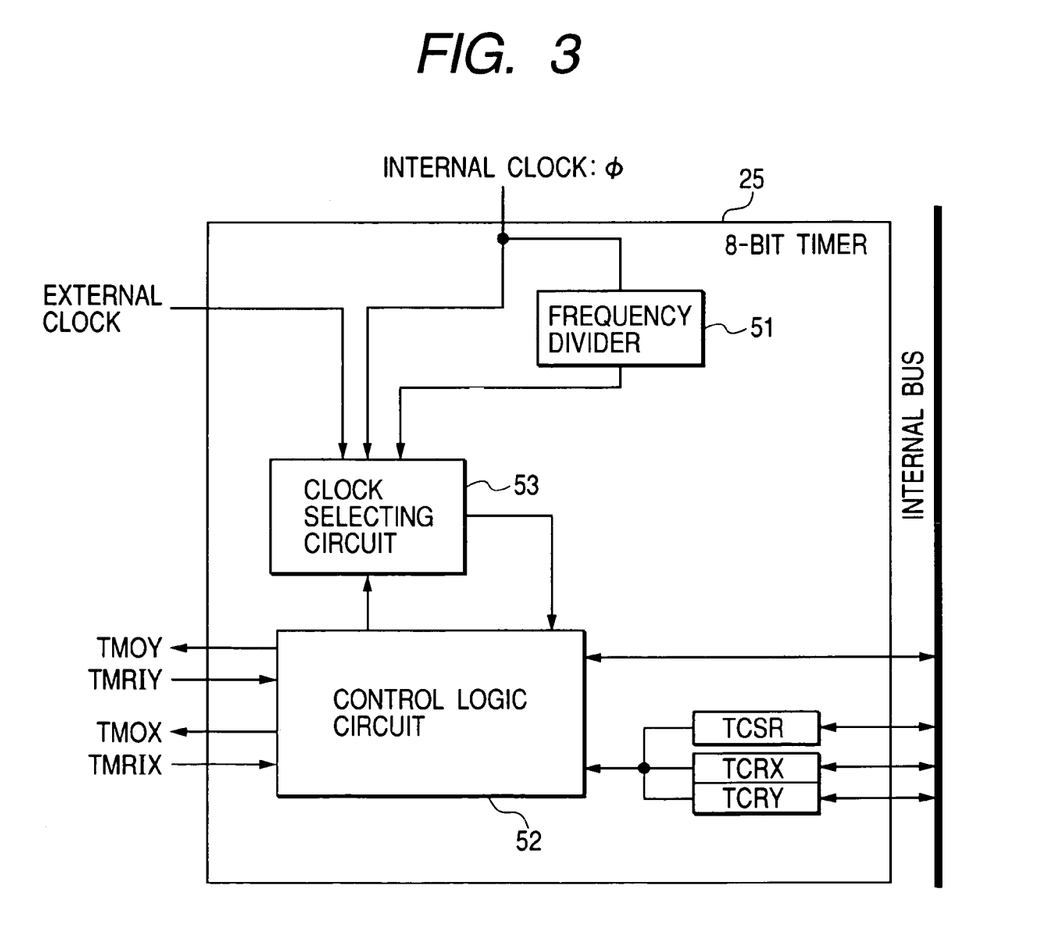
FIG. 3 is a block diagram showing the 8-bit timer in the one-chip microcomputer according to the one embodiment of the present invention.
Figure 4:
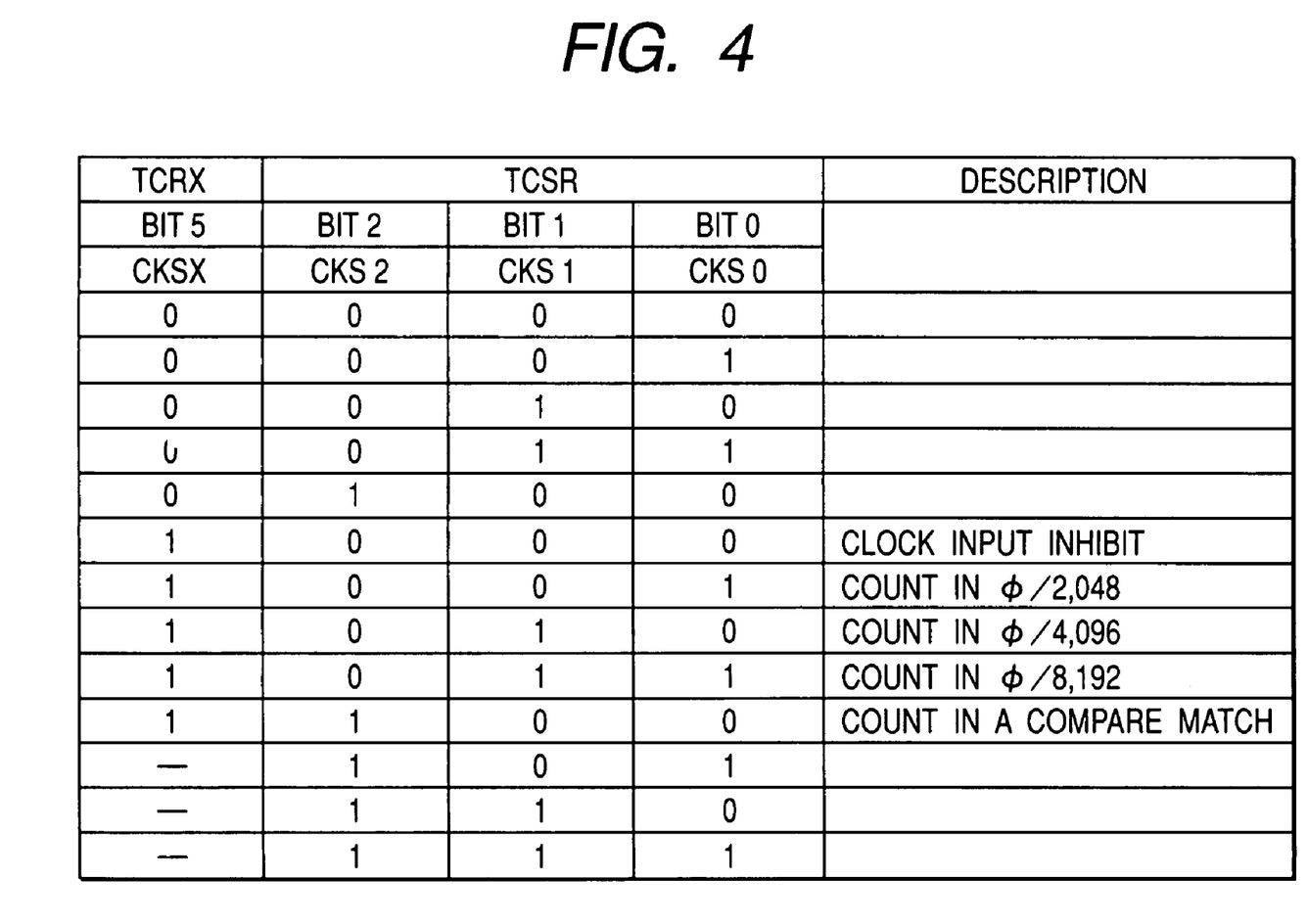
FIG. 4 is an explanatory drawing showing a setting (Channel 1) of a timer control register and a timer control/status register in the 8-bit timer of the one-chip microcomputer according to the one embodiment of the present invention.
Figure 5:
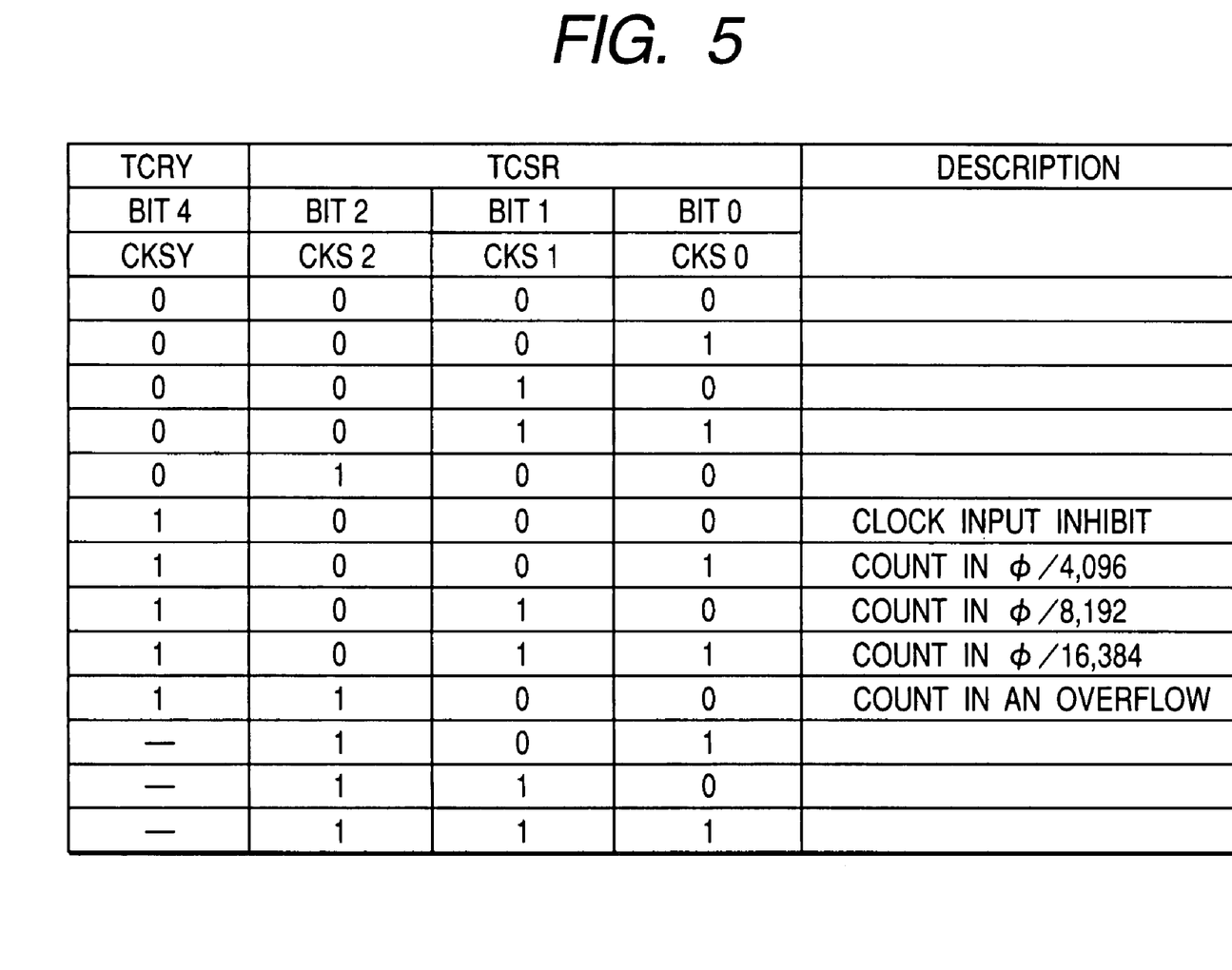
FIG. 5 is an explanatory drawing showing the setting (Channel 2) of the timer control register and the timer control/status register in the 8-bit timer of the one-chip microcomputer according to the one embodiment of the present invention.
Figure 6:
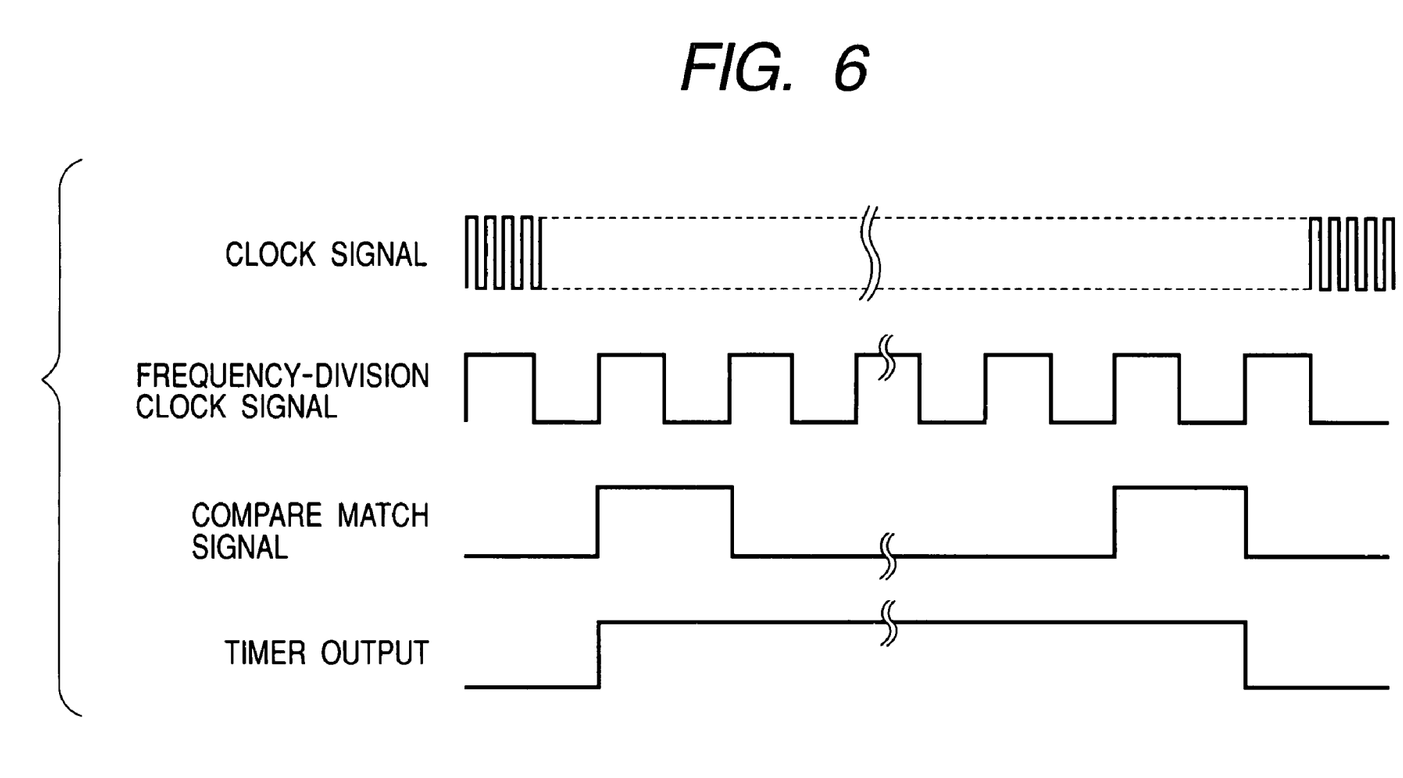
FIG. 6 is a waveform chart showing a signal generated by the 8-bit timer in the one-chip microcomputer according to the one embodiment of the present invention.

Subsequently, an example of the configuration and operation of an 8-bit timer is described in detail with reference to FIGS. 3 to 6. FIG. 3 shows a block diagram of the 8-bit timer, FIG. 4 shows a setting (Channel 1) of a timer control register or timer control/status register, FIG. 5 shows the setting (Channel 2) of the timer control register or timer control/status register, and FIG. 6 shows a waveform chart of a signal generated by the 8-bit timer respectively.

The 8-bit timer 25 is a low resolution timer that can be used for controlling the fans 6, 7 of cooling equipment. For instance, as an example is shown in FIG. 3, the timer is composed of the aforementioned frequency divider 51 and control logic circuit 52, a clock selecting circuit 53, timer control registers TCRX (Channel 1), TCRY (Channel 2), and a timer control/status register TCSR.

The frequency divider 51 uses an internal clock signal $\Phi$ as input and frequency-divides this internal clock signal $\Phi$, then generates frequency-divided clock signals $\Phi/2$, $\Phi/4$, $\Phi/256$, $\Phi/2,048$. The clock selecting circuit 53 selects a desired clock signal from among the internal clock signal $\Phi$, the clock signals $\Phi/2$, $\Phi/4$, $\Phi/256$, $\Phi/2,048$ frequency-divided by the frequency divider 51, and an external clock signal. This selection control signal is supplied from the control logic circuit 52.

The control logic circuit 52 synchronizes with the clock signal selected by the clock selecting circuit 53 and performs operation processing based on the data set in the timer control registers TCRX, TCRY and the timer control/status register TCSR, then generates an output signal TMOX that controls the motor of the fan 6 of Channel 1 and an output signal TMOY that controls the motor of the fan 7 of Channel 2 respectively. Moreover, register reset signals TMRIX, TMRIY are input from an external reset signal to the control logic circuit 52 and each register is initialized.

In an example of the setting of the timer control register TCRX or timer control/status register TCSR on the side of Channel 1, for instance, as shown in FIG. 4, clock input inhibit, a count in $\Phi/2,048$, a count in $\Phi/4,096$, a count in $\Phi/8,192$, and a count in a compare match are enabled by setting TCRX (bit 5), TCSR (bit 2), TCSR (bit 1), and TCSR (bit 0) to 1000, 1001, 1010, and 1100 respectively. That is, in the setting example of this channel 1, three types of control based on $\Phi/2,048$, $\Phi/4,096$, and $\Phi/8,192$ are enabled.

In an example of the setting of the timer control register TCRY or timer control/status register TCSR on the side of Channel 2, for instance, as shown in FIG. 5, clock input inhibit, a count in Φ/4,096, a count in Φ/8,192, a count in Φ/16,384, and a count in an overflow are enabled by setting TCRY (bit 4), TCSR (bit 2), TCSR (bit 1), and TCSR (bit 0) to 1000, 1001, 1010, and 1100 respectively. That is, in the setting example of this channel 2, three types of control based on Φ/4,096, Φ/8,192, and Φ/16,384 are enabled.

In the 8-bit timer 25 set as described above, for instance, as an example is shown in FIG. 6, based on a standard clock signal (internal clock signal) Φ, this standard clock signal Φ is frequency-divided by the frequency divider 51 and a compare match signal is generated from the signal selected from the clock selecting circuit 53 in this frequency-divided clock signal, the internal clock signal Φ, and an external clock signal through the control logic circuit 52. A low frequency signal is generated based on this compare match signal and this signal is output as an output signal. For instance, as an example, in this 8-bit timer 25, a frequency signal of 30 to 60 Hz or so is generated. At this point, a compare match signal is generated through the control logic circuit 52 using a control clock defined in the TCSR, TCRX, and TCRY, and signal output is performed using its waveform.

This 8-bit timer 25 mounts two channels of output signals as described previously. One output signal is supplied to the one fan 6 and the other output signal is supplied to the other fan 7. Accordingly, the drive of each of the fans 6, 7 can be independently controlled respectively.

Figure 7:
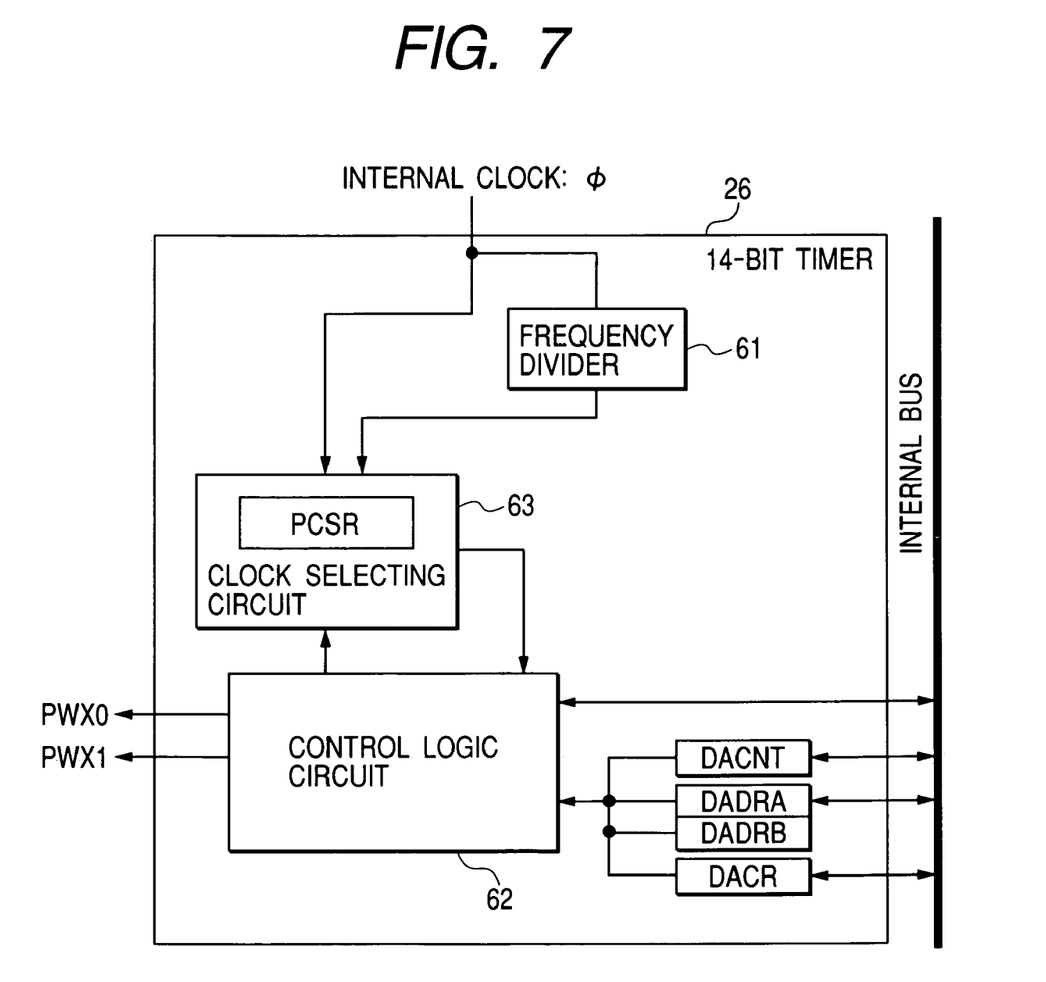
FIG. 7 is a block diagram showing the 14-bit timer in the one-chip microcomputer according to the one embodiment of the present invention.
Figure 8:
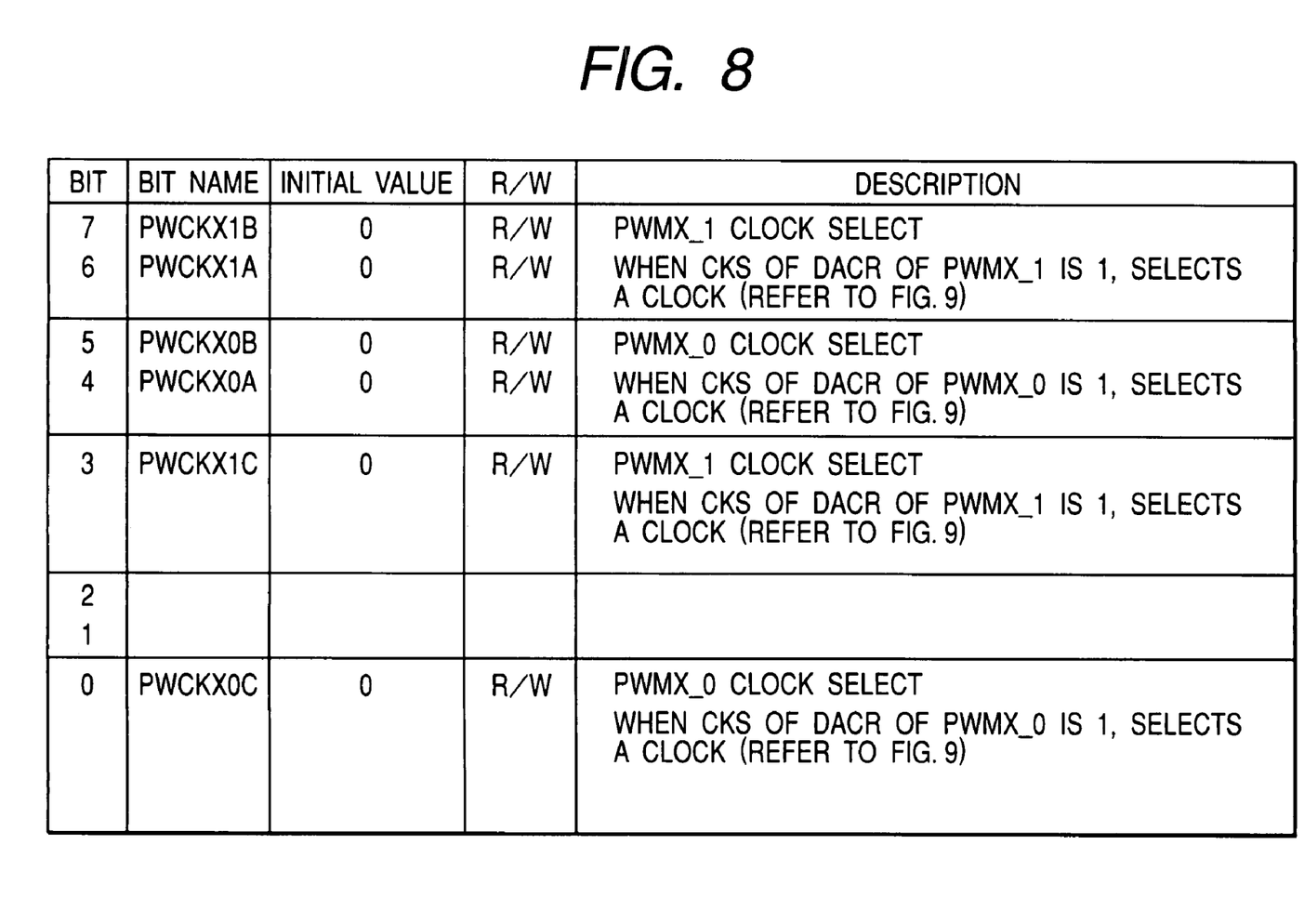
FIG. 8 is an explanatory drawing showing the setting of a peripheral clock selection register in the one-chip microcomputer according to the one embodiment of the present invention.
Figure 9:
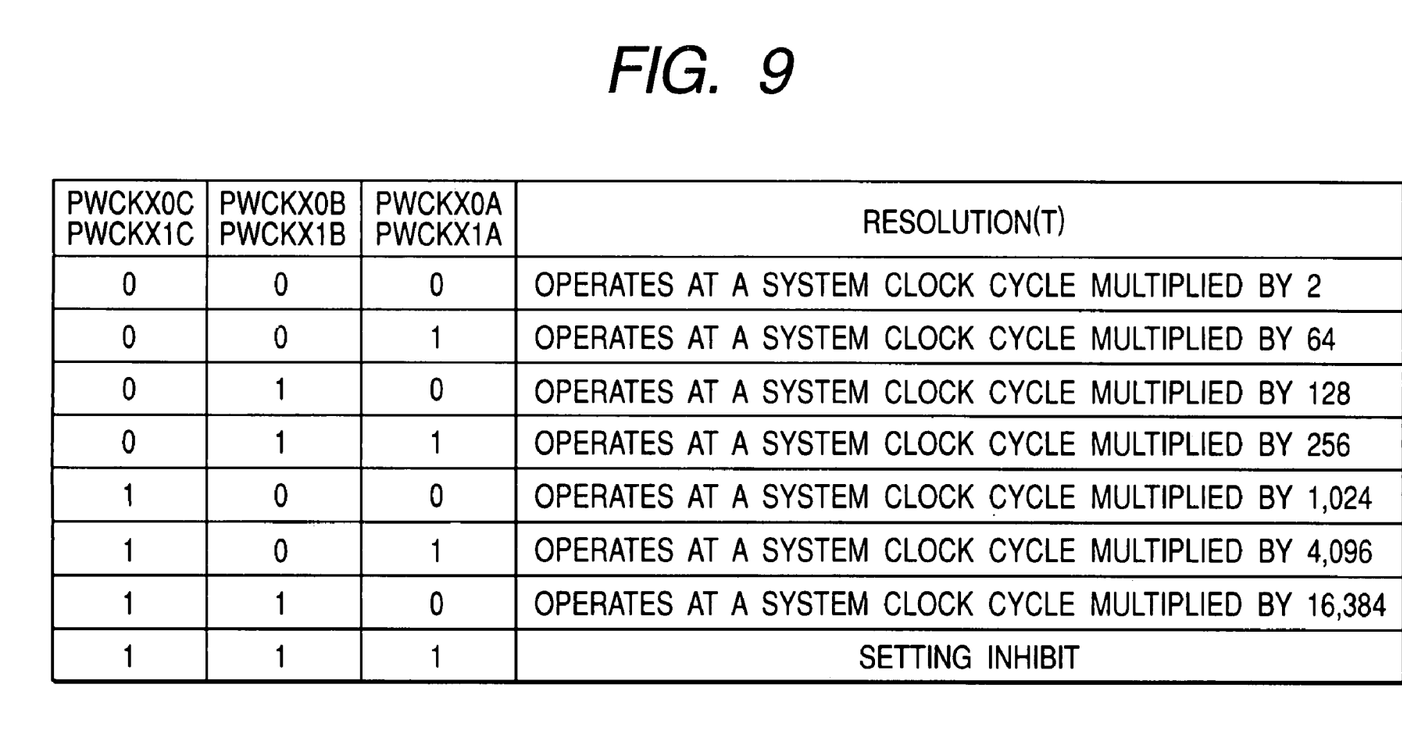
FIG. 9 is an explanatory drawing showing clock selection in the 14-bit timer of the one-chip microcomputer according to the one embodiment of the present invention.
Figure 10:
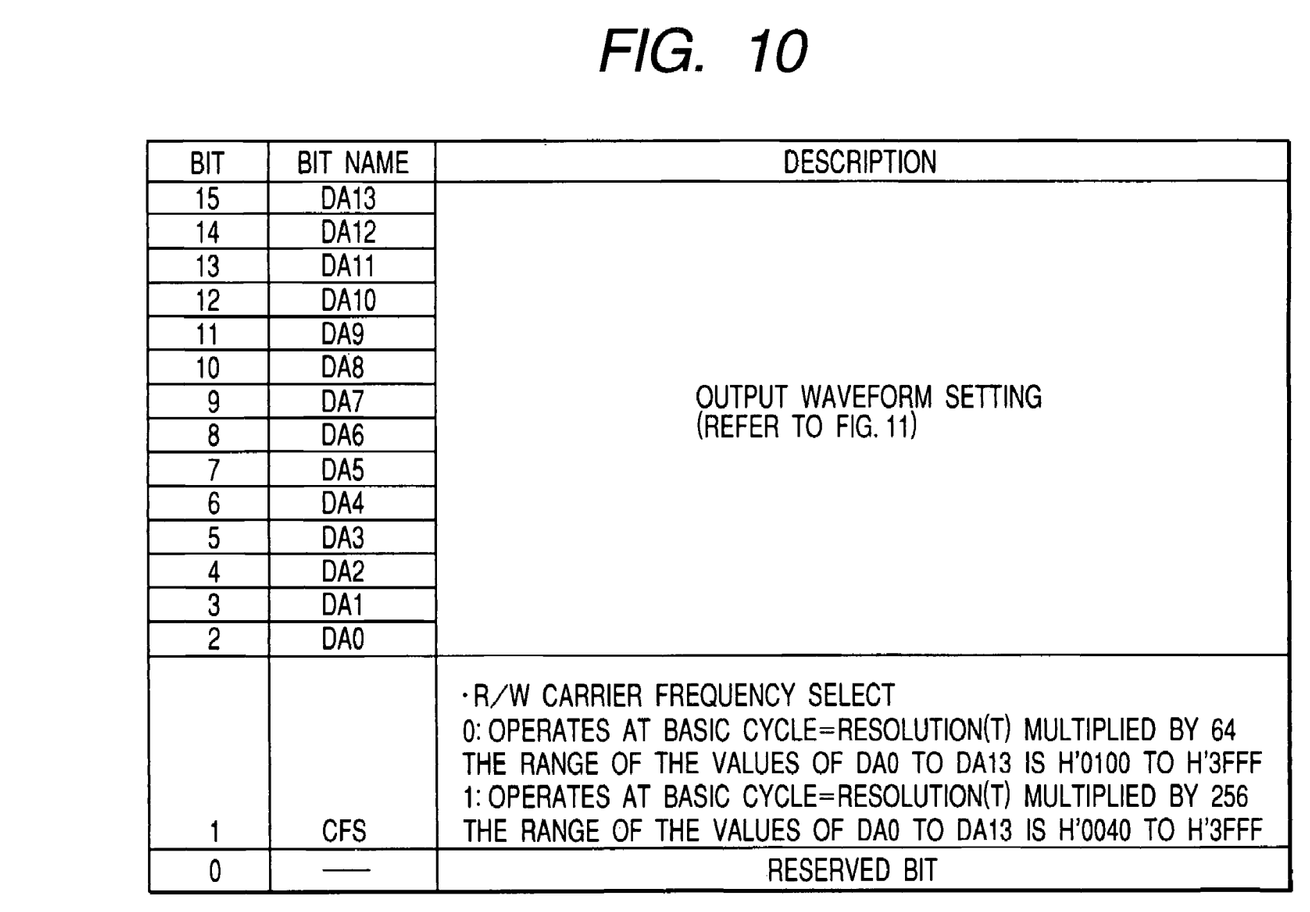
FIG. 10 is an explanatory drawing showing the setting of a PWM data register in the 14-bit timer of the one-chip microcomputer according to the one embodiment of the present invention.
Figure 11:
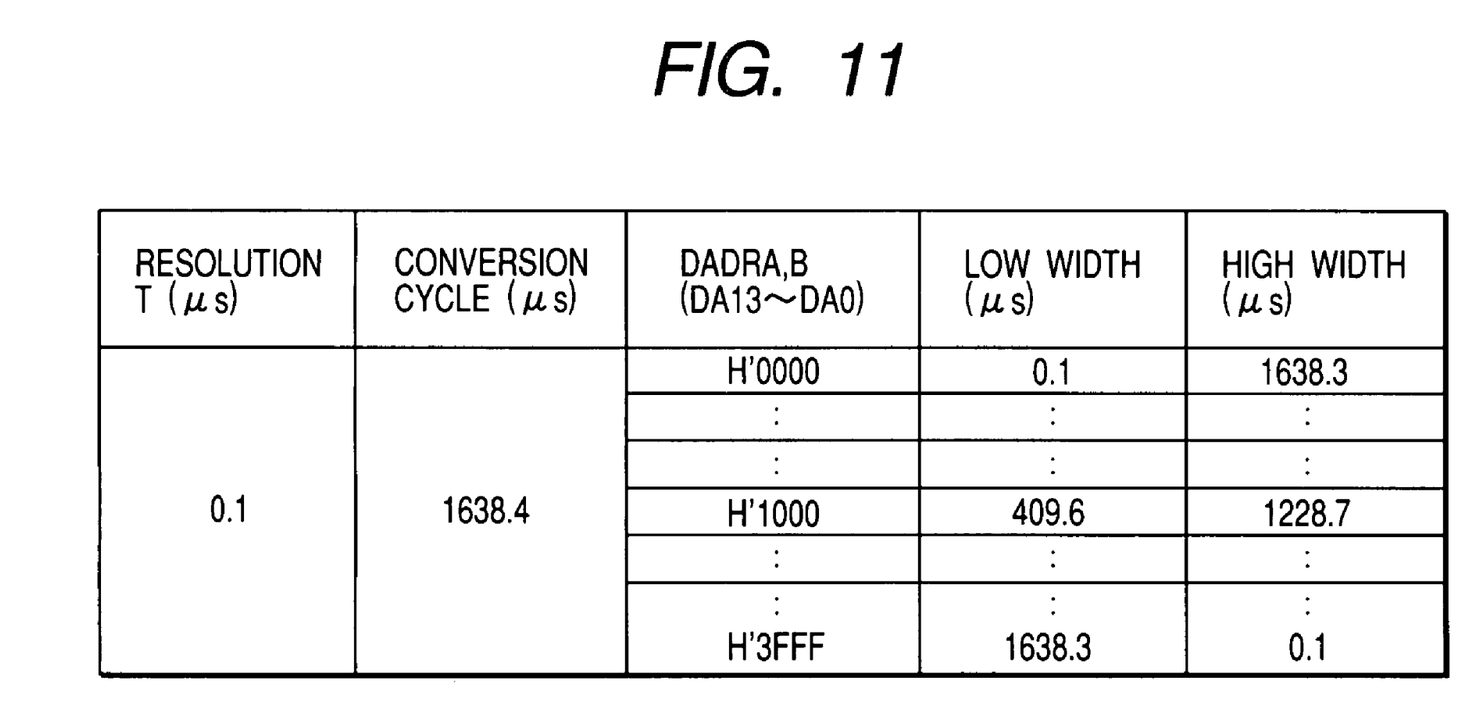
FIG. 11 is an explanatory drawing showing the setting of an output waveform in the 14-bit timer of the one-chip microcomputer according to the one embodiment of the present invention.
Figure 12:
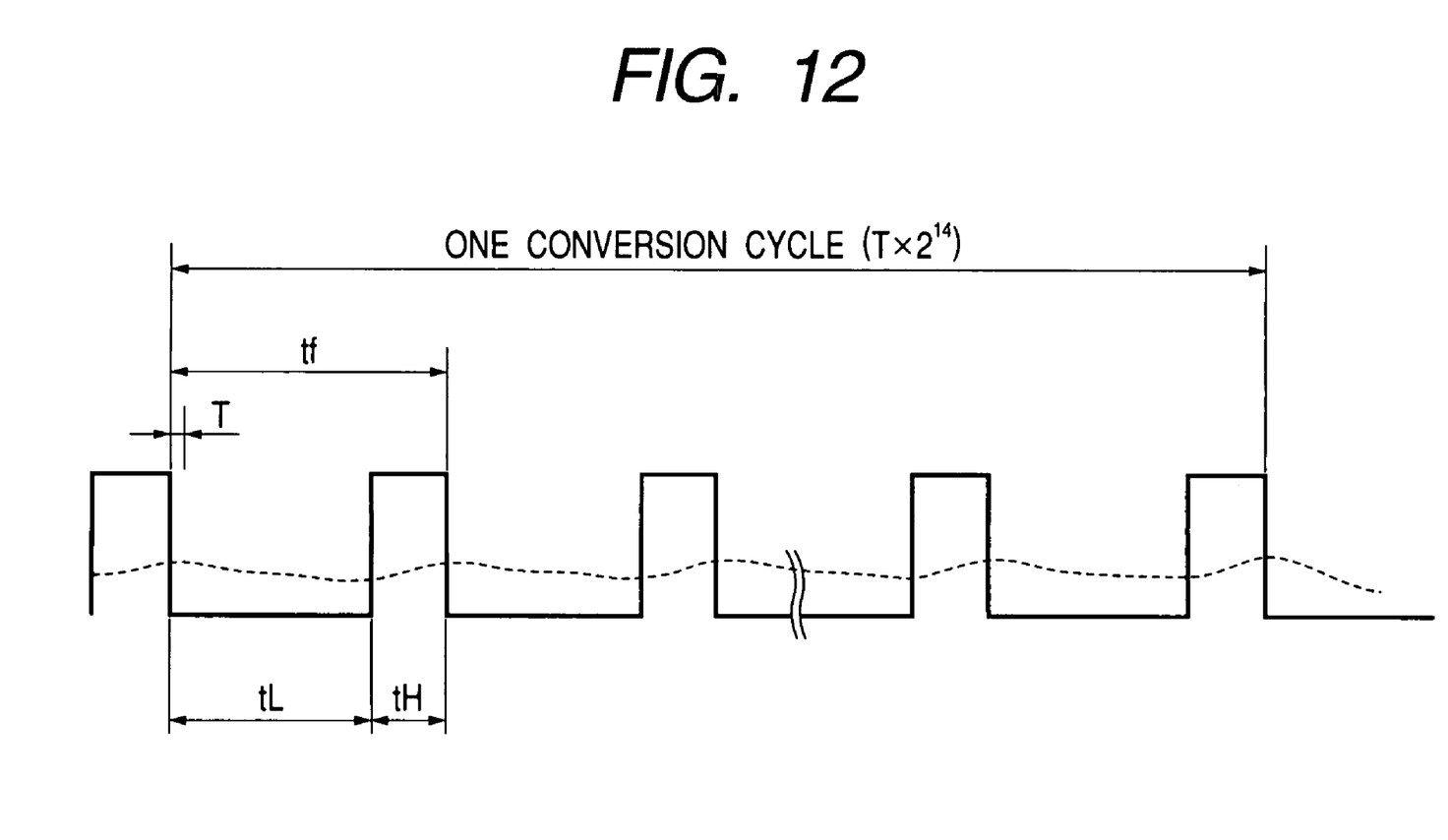
FIG. 12 is a waveform chart showing the signal generated by the 14-bit timer in the one-chip microcomputer according to the one embodiment of the present invention.

Subsequently, an example of the configuration and operation of a 14-bit timer is described in detail with reference to FIGS. 7 to 13. FIG. 7 shows a block diagram of the 14-bit timer, FIG. 8 shows a setting of a peripheral clock selection register, FIG. 9 shows clock selection, FIG. 10 shows the setting of a PWM data register, FIG. 11 shows the setting of an output waveform, and FIG. 12 shows a waveform chart of a signal generated by the 14-bit timer respectively.

The 14-bit timer 26 is a high resolution timer that can be used for adjusting the brightness of an LCD of a display device. For instance, as an example is shown in FIG. 7, the 14-bit timer is composed of the aforementioned frequency divider 61 and control logic circuit 62, a clock selecting circuit 63, a peripheral clock selection register PCSR, PWM data registers DADRA (Channel 1), DADRB (Channel 2), an internal count register DACNT, and a PWM control register DACR.

The frequency divider 61 uses an internal clock signal Φ as input and frequency-divides this internal clock signal Φ, then generates frequency-divided clock signals Φ/2, Φ/64, Φ/128, Φ/256, Φ/1,024, Φ/4,096, Φ/16,384. The clock selecting circuit 63 selects a desired clock signal from the internal clock signal Φ and the frequency-divided clock signals Φ/2, Φ/64, Φ/128, Φ/256, Φ/1,024, Φ/4,096, Φ/16, 384 based on the data set from the CPU 21 to the peripheral clock selection register PCSR. This selection control signal is supplied from the control logic circuit 62.

The control logic circuit 62 synchronizes with the clock signal selected by the clock selecting circuit 63, performs pulse width conversion processing based on the data set in the PWM data registers DADRA, DADRB, the internal count register DACNT, and the PWM control register DACR, and generates an output signal PWX0 that controls the LCD brightness controller 8 of the LCD of Channel 1 and an output signal PWX1 that controls the voltage charger 12 of the batteries 9, 10 of Channel 2 respectively.

In an example of the setting of the peripheral clock selection register PCSR, for instance, as shown in FIG. 8, PWMX_1 Clock Select in bit 7 (PWCKX1B) and the selection of a clock in bit 6 (PWCKX1A) when the CKS of the DACR of PWMX_1 is 1 (refer to FIG. 9 described later), PWMX_0 Clock Select in bit 5 (PWCKX0B) and the selection of a clock in bit 4 (PWCKX0A) when the CKS of the DACR of PWMX_0 is 1 (refer to FIG. 9), PWMX_1 Clock Select and the selection of a clock in bit 3 (PWCKX1C) when the CKS of the DACR of PWMX_1 is 1 (refer to FIG. 9), and PWMX_0 Clock Select and the selection of a clock in bit 0 (PWCKX0C) when the CKS of the DACR of PWMX_0 is 1 (refer to FIG. 9) are enabled.

In an example of PWMX_1, PWMX_0 Clock Select, for instance, as shown in FIG. 9, an operation is enabled when resolution (T) is a system clock cycle multiplied by 2 by setting PWCKX0C/PWCKX1C, PWCKX0B/PWCKX1B, and PWCKX0A/PWCKX1A to 000, and when the resolution (T) is the system clock cycle multiplied by 64 by setting them to 001 respectively. Subsequently, the operation is enabled in the same manner when the resolution (T) is the system clock cycle multiplied by 128, 256, 1,024, 4,096, or 16,384 by setting them to 010, 011, 100, 101, or 110, and setting inhibit is enabled by setting them to 111. That is, in this setting example, control based on eight types of resolution is enabled together with the system clock cycle itself. The resolution is a standard time when High and Low widths are set in the DADRA, DADRB.

In an example of the setting of the PWM data registers DADRA, DADRB, for instance, as shown in FIG. 10, the setting (refer to FIG. 11 described later) of an output waveform is enabled in bits 15 to 2 (DA13 to DA0). It is made to enable that an operation is performed by setting bit 1 (CFS) to 0 in a basic cycle=resolution (T) multiplied by 64 with R/W Carrier Frequency Select and the range of the DA13 to DA0 values is H'0100 to H'3FFF and the operation is performed by setting bit 1 to 1 in the basic cycle=resolution (T) multiplied by 256 and the range of DA13 to DA0 values is H'0040 to H'3FFF.

In an example (example of Φ: 10 MHz, internal clock Φ) of the setting of an output waveform, for instance, as shown in FIG. 11, in the case of resolution (T)=0.1 μs and conversion cycle=1,638.4 μs, when the PWM data registers DADRA, DADRB (DA13 to DA0) are set to H'0000, the Low width is 0.1 μs and the High width is 1,638.3 μs, . . . , when they are set to H'1000, the Low width is 409.6 μs and the High width is 1,228.7 μs, . . . , and when they are set to H'3FFF, the Low width is 1,638.3 μs and the High width is 0.1 μs.

In the 14-bit timer 26 set as described above, based on a standard clock signal Φ, this standard clock signal Φ is frequency-divided by the frequency divider 61. Subsequently, a high frequency signal is generated from this frequency-divided clock signal through the control logic circuit 62 with a desired duty ratio and the signal having this duty ratio is output as an output signal. For instance, as an example, in this 14-bit timer 26, a frequency clock signal of 270 to 280 Hz or so is generated for adjusting the brightness of an LCD.

In an output waveform by this 14-bit timer 26, for instance, as an example is shown in FIG. 12, the total of zero-level widths (Low width: tL) of pulses (64 for CFS=0 and 256 for CFS=1) generated during one conversion cycle (resolution (T)×$2^{14}$) corresponds to the values of DA13 to DA0 of the PWM data registers DADRA, DADRB. When OS=0, this waveform is output directly. When OS=1, this waveform is reversed and output. When OS=1, the total (TH) of one-level widths (High width: tH) corresponds to the values of DA13 to DA0 of the PWM data registers DADRA, DADRB. Moreover, because a PWM timer has 14-bit conversion accuracy, H/L is converted at a cycle of resolution multiplied by $2^{14}$. Furthermore, a standard clock signal (internal clock signal) and a frequency-division clock signal in this 14-bit timer 26 are almost the same as those of FIG. 6 described previously.

In the example described above, 16 types of waveforms can be selected and generated according to a combination of two types of basic cycles and eight types of resolution. The two types of the basic cycles are the resolution (T) multiplied by 64 and the resolution (T) multiplied by 256. The eight types of resolution are a system clock cycle, and system clock cycles multiplied by 2, 64, 128, 256, 1,024, 4,096, and 16,384.

The signal having a desired duty ratio output from this 14-bit timer 26 is smoothened through a smoothening circuit consisting of a capacitor and a resistor and generates an analog voltage (displayed in a dashed line in FIG. 12) in the LCD brightness controller 8. The LCD brightness can be adjusted by this analog voltage. For instance, a low voltage can be generated by varying a duty ratio and shortening the High period. This low voltage becomes effective for a notebook-size personal computer of which low power consumption is necessary.

Moreover, this 14-bit timer 26 mounts two channels of output signals. One output signal is used for adjusting the LCD brightness as described above and the other output signal is used for controlling the charge and discharge of the batteries 9, 10. Even when the charge and discharge of the batteries 9, 10 are controlled, the charge and discharge of the batteries 9, 10 can be controlled with the signal having a desired duty ratio in the same manner as when the brightness of an LCD is adjusted. The brightness adjustment of this LCD and the charge and discharge control of these batteries can be performed independently every channel respectively.

Hence, according to this embodiment, because a low-speed clock signal can be generated using a low frequency by the 8-bit timer 25, the motors of the fans 6, 7 can be controlled directly. Moreover, because a clock signal having a desired duty ratio can be generated by the 14-bit timer 26, the LCD and the batteries 9, 10 can be controlled by the analog voltage in which this clock signal was smoothened.

As a result, because an exclusive analog power supply is not needed by removing an analog circuit from the one-chip microcomputer 4, the chip size of the one-chip microcomputer 4 is reduced and a notebook-size personal computer in which this one-chip microcomputer 4 was mounted can be simplified.

Although the invention made by this inventor was specifically described based on the embodiment, the present invention is not limited to the aforementioned embodiment. Needless to say, however, the present invention can be modified in various ways within the scope where it will not deviate from the subject matter of the invention.

For instance, the aforementioned embodiment aimed at obtaining an effect caused by removing an analog circuit from a one-chip microcomputer. If an analog circuit is mounted, however, because a function that monitors temperature and a fan rotation by the processing through this analog circuit, and a function that monitors electric power can be mounted, an improved function of the one-chip microcomputer can be implemented.

Among the inventions disclosed in this application, effects obtained from the typical invention will be described briefly below.

(1) A low resolution timer that can be used for controlling cooling equipment and a high resolution timer that can be used for adjusting the brightness of a display device are mounted in a one-chip microcomputer. Accordingly, the cooling equipment can be controlled by the low resolution timer and the brightness of the display device can be adjusted by the high resolution timer. Consequently, because an analog circuit need not be mounted and an exclusive analog power supply is not needed, the reduction in the chip size of a one-chip microcomputer, and the simplification of a system using this one-chip microcomputer can be realized.

(2) A one-chip microcomputer can still more realize the reduction in a chip size and the simplification of a system by allowing a high resolution timer to be able to be used for controlling the charge and discharge of a battery.

What is claimed is:

1. A microcomputer, comprising:
   a first timer having a first resolution that can be used for controlling cooling equipment; and
   a second timer that has a second resolution higher than said first resolution and that can be used for adjusting brightness of a display device,
   wherein said first timer and said second timer are formed on a semiconductor integrated circuit,
   wherein said first timer outputs a first signal of a first frequency,
   wherein said second timer outputs a second signal of a second frequency higher than said first frequency,
   wherein said second timer is operable to control charging and discharging of a battery coupled to said semiconductor integrated circuit, and
   wherein said signal of said first frequency and said signal of said second frequency are generated by frequency-dividing a standard clock signal.

2. The microcomputer according to claim 1, wherein said second timer comprises a pulse width conversion circuit.

3. The microcomputer according to claim 1,
   wherein said first timer is operable to output one of a plurality of signals as said signal of said first frequency,
   wherein said second timer outputs a third signal of a third frequency for controlling the battery, and
   wherein said second signal differs in pulse width from said third signal.

4. The microcomputer according to claim 1, further comprising:
   a keyboard controller for controlling a keyboard coupled to said semiconductor integrated circuit.

5. A microcomputer formed on a semiconductor integrated circuit, comprising:
   a first pulse unit having a first resolution operable to control a cooling device; and
   a second pulse unit having a second resolution higher than said first resolution and operable to adjust brightness of a display device;
   wherein said second pulse unit is operable to control charging and discharging of a battery device;
   wherein said first pulse unit is operable to output a first pulse signal of a first frequency;
   wherein said second pulse unit is operable to output a second pulse signal of a second frequency and a third pulse signal of a third frequency; and
   wherein said first frequency and said second frequency are obtained by frequency-dividing a standard clock signal.

6. The microcomputer formed on a semiconductor integrated circuit according to claim 5,
   wherein said second and third frequencies are higher than said first frequency, and
   wherein said third pulse signal is a control signal for charging and discharging said battery device.

* * * * *